Dec. 11, 1945.    F. W. KURTH    2,390,719
TRICYCLE
Filed Dec. 28, 1944    2 Sheets-Sheet 1

Inventor
FRED W. KURTH

Dec. 11, 1945.     F. W. KURTH     2,390,719
TRICYCLE
Filed Dec. 28, 1944     2 Sheets-Sheet 2

Inventor
FRED W. KURTH

Patented Dec. 11, 1945

2,390,719

UNITED STATES PATENT OFFICE 2,390,719

TRICYCLE

Fred W. Kurth, Farmingdale, N. J.

Application December 28, 1944, Serial No. 570,160

2 Claims. (Cl. 280—234).

This invention relates to a tricycle and it is one object of the invention to provide a tricycle having a special arrangement of propelling and steering mechanism, the construction being such that the tricycle may be propelled with both the legs and the arms, the portion of the propelling means gripped by a person's hands also constituting the means for steering the tricycle.

Another object of the invention is to provide a tricycle wherein the front axle carries sprocket wheels over which are trained sprocket chains driven from sprocket wheels carried by shafts provided with cranks operated by the feet and hands of the rider, thus permitting the tricycle to be very easily operated at rapid speed with minimum effort by the rider.

Another object of the invention is to provide a tricycle wherein the crank shaft operated by the hands and arms of the rider is carried by the shank of the front fork, thus permitting the rider to steer the tricycle while at the same time imparting motion to it with his arms.

Another object of the invention is to provide a tricycle which is simple in construction, easy to operate, and capable of being manufactured at low cost.

The invention is illustrated in the accompanying drawings, wherein.

Figure 1:
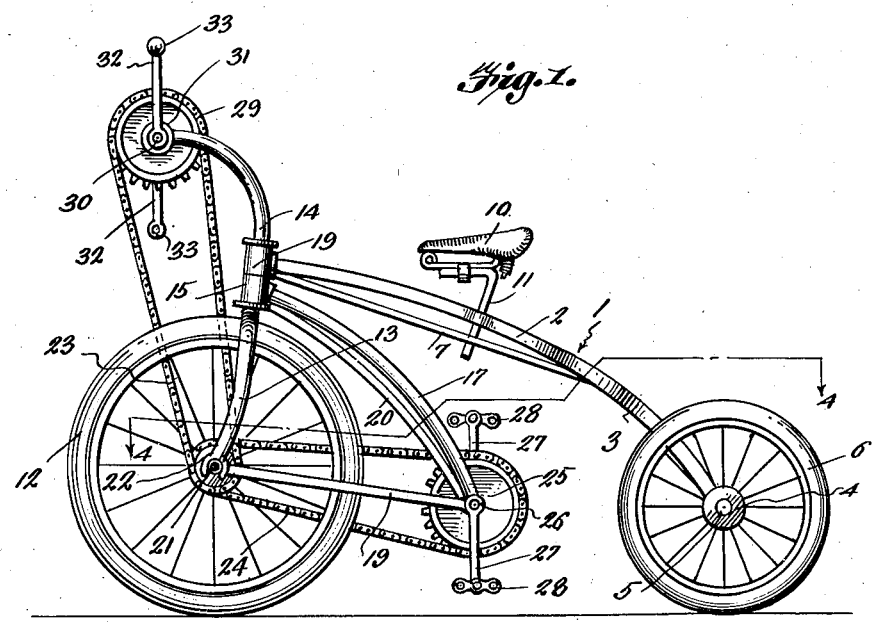
Fig. 1 is a side elevation of the improved tricycle.
Figure 2:
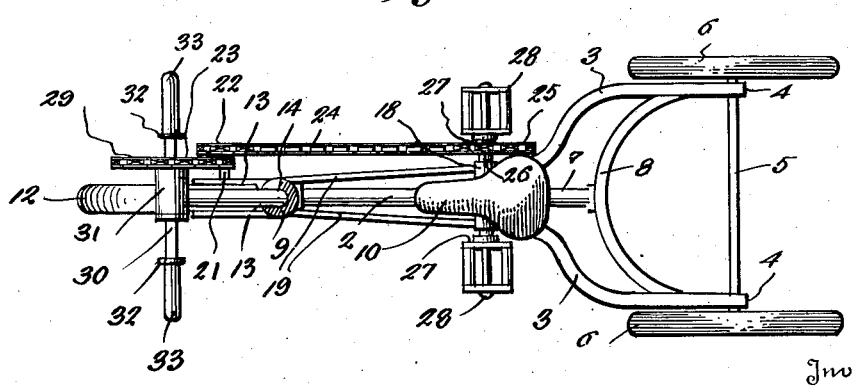
Fig. 2 is a top plan view thereof.
Figure 3:
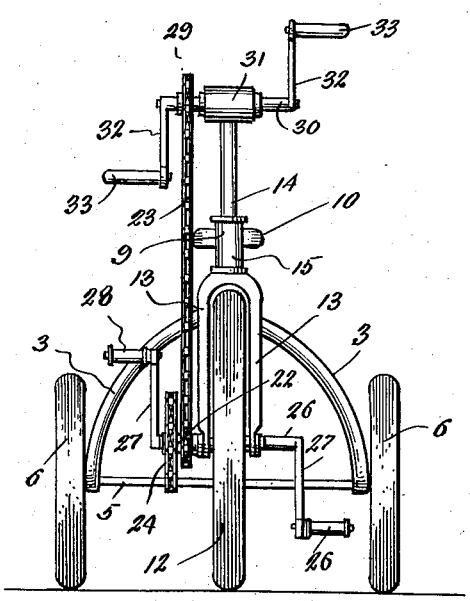
Fig. 3 is a front view of the tricycle.
Figure 5:
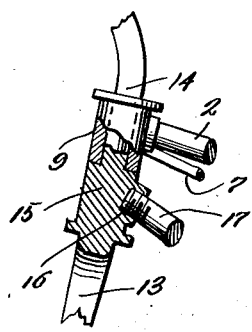
Fig. 5 is a fragmentary sectional view illustrating the manner in which the front fork is mounted.
Figure 4:
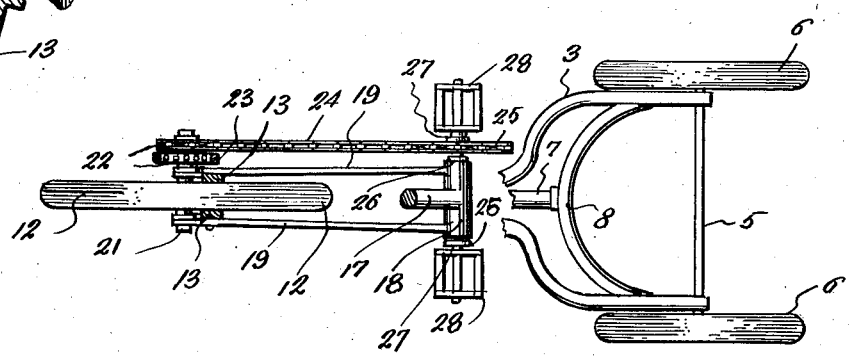
Fig. 4 is a view taken on the line 4—4 of Fig. 1.

This improved tricycle has a frame 1 formed of strong metal which is preferably tubular and includes a bar 2 having rearwardly extending forks or arms 3 terminating in bearings 4 through which the rear axle or shaft 5 carrying rear wheels 6 is rotatably mounted. The frame is curved longitudinally so that it is upwardly bowed for added strength and braced by a bar 7 having a yoke 8 at its rear end which extends rearwardly and has its ends secured to the forks or arms 3. At its front end the bar 2 carries a vertically disposed bearing sleeve 9 and intermediate its length the frame carries a saddle 10 having its post 11 mounted in any desired manner.

The front wheel 12 is rotatably mounted between the front forks 13 in a conventional manner and has its hub equipped with a coaster brake of conventional formation permitting forward drive to be applied to the wheel but causing the tricycle to be brought to a stop when rearward force is applied to the wheel. The shank 14 of the forks 13 is mounted through the bearing 9 for turning movement so that by turning the shank, the front wheel may be turned toward one side or the other from normal position and the tricycle thus steered. At the junction of the shank with the forks, there is formed an enlargement 15 upon which the bearing sleeve rests and this enlargement is formed with a socket 16 to receive a bar 17. The bar extends rearwardly from the enlargement at a downward incline and, at its rear end, is a transversely extending bearing sleeve 18 braced by bars 19 which have their front fixed to the forks 13. A rod 20 braces the bar 17.

The axle 21 of the front wheel is of such length that it projects laterally from one fork 13 an appreciable distance and this projecting end portion of the axle carries sprocket wheels 22 about which are trained the sprocket chains 23 and 24. The chain 24 extends longitudinally of the tricycle and has its rear portion trained about a sprocket wheel 25 carried by a shaft 26 having crank arms 27 to which are connected pedals 28 so that the rider occupying the saddle 10 may place his feet upon the pedals and turn the shaft 26 and transmit forward rotary motion to the front wheel. The chain 23 extends vertically and has its upper portion trained about a sprocket wheel 29 carried by a shaft 30 which is journaled through a bearing 31 carried by the shank 14. The shaft 30 carries cranks 32 provided with handles 33 to be gripped by the hands of the rider and when the shaft 30 is turned in a forward direction, rotary motion will be transmitted to the front wheel. It will thus be seen that the rider may propel the tricycle with both his feet and his hands and readily propel it forward at high speed, or up a hill very easily. By ceasing forward turning of the shafts 26 and 30, the tricycle may be allowed to coast forwardly and when pressure is applied to impart rearward turning to the shafts, the brake will be applied to the front wheel and the tricycle brought to a stop. The shank 14 of the front forks is curved longitudinally so that it projects forwardly and constitutes a steering arm or lever and, since the rider grasps the handles 33 at opposite sides of this shank or arm, the shank may be readily turned in the bearing 9 and the tricycle steered when in use.

By mounting a baggage carrier between the rear forks, a load of considerable weight may be carried at the rear of the tricycle.

Having thus described the invention, what is claimed is:

1. A tricycle comprising a frame having a vertical bearing at its front end and forks at its rear end, a rear axle carried by said forks, wheels carried by the rear axle, front forks having a shank extending upwardly therefrom and journaled through the bearing, a transverse bearing at the free end of said shank, a front wheel having an axle rotatably carried by the front forks, a bar extending rearwardly from the shank over the front wheel and downwardly back of the front wheel, a bearing at the rear end of said bar, a crank shaft journaled through the bearing of said bar and provided with pedals for engagement by the feet of a rider, a crank shaft journaled through the bearing of said shank and provided with handles for gripping by the rider, sprockets carried by the crank shafts and the front axle, and chains trained about said sprockets.

2. A tricycle comprising a frame having a vertical bearing at its front end and forks at its rear end, a rear axle carried by said forks, wheels carried by the rear axle, front forks having a shank extending upwardly therefrom and journaled through the bearing, said shank having an enlargement upon which the bearing rests and above the bearing being curved forwardly and at its upper free end provided with a transverse bearing, a front wheel between the forks having an axle rotatably carried by the forks and projecting from a side thereof, an auxiliary frame including a bar carried by and extending rearwardly and downwardly from said enlargement and a transverse bearing at its rear end, bracing rods for the bearing of the auxiliary frame extending forwardly therefrom and having their front ends fixed to the forks, crank shafts journaled through the bearings of the shank and the auxiliary frame, sprocket wheels carried by said crank shafts and by the axle of the front wheel, and chains trained about said sprocket wheels for transmitting rotary movement from the crank shafts to the axle and the front wheel.

FRED W. KURTH.